US006477645B1

(12) United States Patent
Drews

(10) Patent No.: US 6,477,645 B1
(45) Date of Patent: Nov. 5, 2002

(54) AUTHORITY AND INTEGRITY CHECK IN SYSTEMS LACKING A PUBLIC KEY

(75) Inventor: Paul C. Drews, Gaston, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/243,663

(22) Filed: Feb. 3, 1999

(51) Int. Cl.[7] ................................................ G06F 1/24
(52) U.S. Cl. ...................... 713/168; 713/170; 713/176; 713/180; 713/182
(58) Field of Search ................................ 713/168, 170, 713/176, 180, 182

(56) References Cited

U.S. PATENT DOCUMENTS

| | | | |
|---|---|---|---|
| 4,264,782 A | 4/1981 | Konheim | 178/22 |
| 5,005,200 A | 4/1991 | Fischer | 380/30 |
| 5,420,927 A | 5/1995 | Micali | 380/23 |
| 5,465,299 A | 11/1995 | Matsumoto et al. | 380/23 |
| 5,953,420 A * | 9/1999 | Matyas et al. | 380/285 |
| 6,190,257 B1 * | 2/2001 | Takeda et al. | 463/29 |
| 6,292,896 B1 * | 9/2001 | Guski et al. | 713/169 |

* cited by examiner

*Primary Examiner*—Thomas R. Peeso
(74) *Attorney, Agent, or Firm*—Schwegman, Lundberg, Woessner & Kluth, P.A.

(57) ABSTRACT

A system for checking the integrity and authority of information includes a user platform, a communication channel, and a remote platform. The remote platform transmits the information to the user platform via the communication channel. The user platform, which lacks a public key for the information, verifies the authority and integrity of the information by comparing a transformation value of the information generated on the platform to a transformation value supplied by a user. The platform is also capable of authenticating the information by displaying the transformation value generated from the information and requesting that the user match the transformation value generated from the information with a transformation value known to the user.

36 Claims, 3 Drawing Sheets

AUTHORITY AND INTEGRITY CHECK IN SYSTEMS LACKING A PUBLIC KEY

FIELD OF THE INVENTION

This invention relates to a system and method for verifying the authority and integrity of information, and more particularly to a system and method for verifying the authority and integrity of information when a public key is unavailable.

BACKGROUND OF THE INVENTION

In the field of information technology (IT) management, a large number of computing platforms, such as personal computers, servers, communication devices, and mainframes can be networked together and managed by a single organization. The management of these platforms often requires remote installation and configuration of software. One problem associated with the remote installation and configuration of software is assuring that only authorized code and configuration commands are installed and executed on the platforms. Failure to address this problem can result in problems ranging in seriousness from having merely incompatible or untested applications installed on the platforms to having a malicious virus introduced into the network.

After networked platforms are installed and operational, a public key for the IT management organization responsible for maintaining the platforms is stored on each platform. This permits the IT management organization to affix a digital signature to software and commands sent to each platform. A digital signature is a device by which the source and integrity of transmitted information can be verified. Before the installation of software or the execution of commands, the digital signature is verified at the platform by using the public key for the IT management organization to confirm that the software or commands came from an authorized source.

Unfortunately, in today's fast paced and heavily networked environments new platforms arriving directly from a manufacturer are constantly being connected to existing networks. These new platforms do not yet contain the public key for the IT management organization, so software and commands sent to the platform cannot yet be authenticated using public key cryptography. This is a problem when initial setup of a newly installed platform is performed remotely by an IT organization, since a few pieces of code and configuration commands must be installed on the platform to identify the responsible IT management organization by its public key for the first time. In essence, there is a window of time during which, for a newly installed platform, the standard mechanism for verifying the source and integrity of transmitted information and commands is unavailable.

For these and other reasons, there is a need for the present invention.

SUMMARY OF THE INVENTION

In one embodiment of the invention, a system includes a user platform, a communication channel, and a remote platform. The user platform authenticates information using a transformation value generated from the information. The remote platform transmits the information to the user platform via the communication channel.

DETAILED DESCRIPTION OF THE INVENTION

Figure 1:
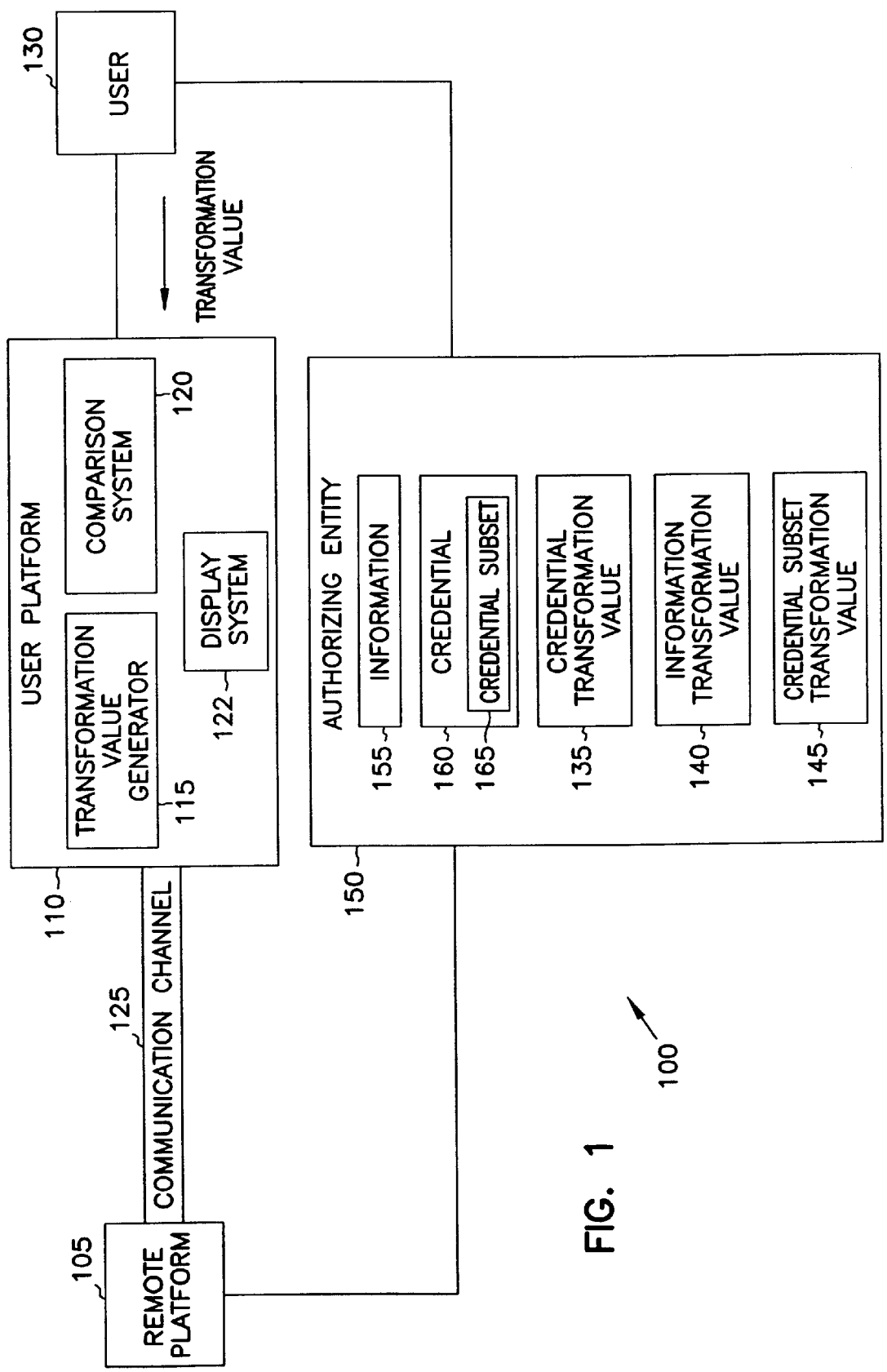
FIG. 1 is a block diagram of a system for authenticating information, according to one embodiment of the invention.

Referring to FIG. 1, a block diagram of one embodiment of system 100 for providing authority and integrity checks in a system lacking a public key is shown. System 100 includes remote platform 105, user platform 110, including transformation value generator 115, comparison system 120, and display system 122. Remote platform 105 is coupled to user platform 110 by communication channel 125. User 130 is capable of receiving input, such as credential transformation value 135, information transformation value 140, or credential subset transformation value 145, from authorizing entity 150 for input into comparison system 120 of user platform 110. Remote platform 105 is capable of receiving information 155 and credential 160, which includes credential subset 165 from authorizing entity 150.

Remote platform 105 is capable, in one embodiment, of staging and transmitting information 155 and credential 160 to user platform 110. Remote platform 105 is not limited to any particular type of device and can be a computer, such as a personal computer, a server or a mainframe, or a communication device, Such as a cell phone, or a television or radio transmitter or transceiver. Those skilled in the art will recognize that any device capable of transmitting information to user platform 110 can function as remote platform 105.

The present invention ensures the authority and integrity of information received at user platform 110, so it is not limited in the type of information transmitted from remote platform 105 to user platform 110. In one embodiment of the invention, information 155 is a boot image, but those skilled in the art will recognize that the present invention is equally applicable to the transmission of information such as application software or data.

Credential 160, in one embodiment, contains authority information, such as a digital signature or a digital signature in combination with other information, such as a digital certificate that normally accompanies transmitted information. The authority information, without a public key that designates the authorized source of the credential's digital signature installed on user platform 110, is insufficient to check the authority of the credential. However, a credential which includes a digital signature that covers the rest of the credential can be used to check the integrity of the credential.

User platform 110 is provided for the purpose of receiving transmitted information such as information 155, credential 160, or information 155 and credential 160 from remote platform 105. User platform 110 is the target device for software, commands, or data staged on remote platform 105, and can be a computer, such as a personal computer, a server or a mainframe, or a communication device, such as a pager, a cell phone, or a television or radio receiver or transceiver. Like remote platform 105, user platform 110 is not limited to any pailicular type of device, and those skilled in the art will recognize that any device capable of receiving information from remote platform 105 can be used in the present invention.

Communication channel 125 is provided to couple remote platform 105 to user platform 110. Communication channel 125 is selected to match the particular communication standard supported by remote platform 105 and user platform 110. For example, if remote platform 105 and user platform 110 communicate at 10 million bits per second (Mbps) using the Ethernet (Institute of Electrical and Electronics Engineers 802.3) standard, then communication channel 125 is configured using twisted pair. For electrical communications, communication channel 125 is a wire, twisted pair, a coaxial cable or free space, and for optical communications, communication channel 125 is a clear optical path or a fiber optic cable. As those skilled in the art will recognize, any communication channel 125 that permits communication between remote platform 105 and user platform 110 is suitable for use in the present invention.

Transformation value generator 115 is provided to convert a variable length amount of digital data into a more concise form. In one embodiment of the invention, generator 115 is a hash function. A hash function accepts any length input and generates a fixed length output. Hash functions are known in the art and those skilled in the art will recognize that a hash function suitable for use in embodiments of the present invention is one that is relatively easy to compute, one-way, and collision-free.

The transformation value generated in embodiments of the present invention must cover the information, to guard against substitution of ail or part of the information. A transformation value can cover the information directly, for example, where the transformation value is a hash of the information, or a transformation value can cover the information through one or more levels of indirection, for example, where the transformation value is a hash of some part of the credential that in turn contains a hash of the information.

Comparison system 120 is provided to compare the value produced by transformation value generator 115, processing credential 160, information 155 or credential subset 165 to credential transformation value 135, information transformation value 140, or credential subset transformation value 145 supplied by user 130. Comparison system 120 can be implemented in hardware or software.

Display system 122 is provided for the purpose of displaying the value generated by the transformation value generator 115. The type of display is determined by the nature of user platform 110. For example, if user platform 110 is a cell phone, the display is typically a liquid crystal display. Those skilled in the art will recognize that the type of display system 122 is not critical to the practice of the present invention.

Authorizing entity 150 generates and supplies information transformation value 140, credential transformation value 135, and credential subset transformation value 145 to user 130. Authorizing entity 150 also supplies information 155, credential 160, and credential subset 165, to remote platform 105. Authorizing entity 150 can be an IT management organization or some other entity that authorizes the installation of software or data or the execution of commands on user platform 110. Authorizing entity 150 generates credential transformation value 135, information transformation value 140, or credential subset transformation value 145 from a transformation value generator which performs the same transformation as the transformation value generator 115 that resides on user platform 110. Thus, authorizing entity 150 is capable of generating the same transformation value as is generated on user platform 110.

Authorizing entity 150 is capable of supplying credential transformation value 135, information transformation value 140, and credential subset transformation value 145 to user 130. In one embodiment of the invention, the supplied transformation value is printed on paper and mailed or hand delivered to user 130. In an alternate embodiment, the transformation value is supplied to user 130 in audio form through a telephone call. And in yet another embodiment, the transformation value is supplied in digital form to user 130 through a communication device, such as a pager.

User 130 is capable of receiving credential transformation value 135, information transformation value 140, and credential subset transformation value 145 from authorizing entity 150 and submitting a transformation value to comparison system 120 of user platform 110. In one embodiment of the invention, user 130 is a person and authorizing entity 150 supplies a transformation value to the person. In an alternate embodiment, user 130 is a software agent and authorizing entity 150 supplies a transformation value to the agent. Software agents are known in the art, and those skilled in the art will recognize that the present invention is not limited to a human user.

The operation of system 100 is best understood by describing its operation with respect to the type of transformation value supplied by authorizing entity 150 to user 130.

In one embodiment, authorizing entity 150 supplies information transformation value 140, computed from information 155, to user 130. The transformation value is computed such that all parts of the information contribute to the transformation value in a way that is one-way and collision-free. In one embodiment, user platform 110 receives information transformation value 140 from user 130. Comparison system 120 compares the received information transformation value 140 with the output of transformation value generator 115, which generates a transformation value of information 155 supplied by remote platform 105. A match authenticates information 155 by ensuring the integrity and the authority of information 155.

In an alternate embodiment, on user platform 110, the transformation value of information 155, which is generated by transformation value generator 115 from information 155, is displayed on display system 122. User 130 views the displayed transformation value, and in response to a query compares it to known information transformation value 140 received from authorizing entity 150. A match ensures both the integrity and the authority of information 155. An advantage of this embodiment is that a credential does not need to be transmitted to user platform 110 or processed by user platform 110. A second advantage is that user platform 110 can ensure the authority and integrity of separate pieces of information supplied by different authorizing entities.

In an alternate embodiment, authorizing entity 150 supplies credential transformation value 135 to user 130. Credential transformation value 135 is computed from credential 160. The transformation is computed such that all parts of the credential contribute to the transformation value in a way that is one-way and collision-free. In one embodiment, user platform 110 receives credential transformation value 135 from user 130. Comparison system 120 compares the received credential transformation value 135 with the output of transformation value generator 115, which generates a transformation value of credential 160 supplied by remote platform 105 from authorizing entity 150. A match ensures the authority of information 155.

In an alternate embodiment, on user platform 110, the transformation value of credential 160, which is generated by transformation value generator 115 from credential 160, is displayed on display system 122. User 130 views the displayed transformation value, and in response to a query compares it to credential transformation value 135 received from authorizing entity 150. A match ensures the authority of information 155. To test the integrity of information 155, a transformation value contained in credential 160 is compared to a transformation value computed from information 155. An advantage of this embodiment is that the same information and credential are transmitted to user platform 110 whether or not user platform 110 has a public authority key installed. A second advantage is that special case processing that would involve varying manual procedures and varying transmission protocols in the limited software environment in the early stages of the platform boot cycle is avoided.

In still another embodiment, authorizing entity 150 supplies credential subset transformation value 145 to user 130, and credential subset 165 to remote platform 105. The information contained in credential subset 165 is a subset, such as the authorizing entity's digital certificate or public key, of credential 160, which identifies authorizing entity 150. In one embodiment, user platform 110 receives credential subset transformation value 145 from user 130 and credential subset 165.from remote platform 105. Comparison system 120 compares the received credential subset transformation value 145 with the output of transformation value generator 115, which generates a transformation value of credential subset 165 supplied by remote platform 105. A match ensures the authority of information 155.

In an alternate embodiment, on user platform 110, the transformation value of credential subset 165, which is generated by transformation value generator 115 from credential subset 165, is displayed on display system 122. User 130 views the displayed transformation value, and in response to a query compares it to credential subset transformation value 145 known and received from authorizing entity 150. A match ensures the authority of information 155. In either of the two previous embodiments, user platform 110 uses this authorized subset of the credential to test the integrity of the rest of the credential. In one embodiment, the digital certificate or public key is used to verify a digital signature over the rest of the credential. The user platform uses the credential to test the integrity of the information, as described above. An advantage of this embodiment is that there are few differences in the implementation on a platform that has a public authority key installed and a platform that does not have a public authority key installed. Another advantage of this embodiment is that since the transformation value computed in user platform 110 and supplied to user 130 by authorizing entity 150 only covers authorizing entity 150, the same transformation value can be used to authorize multiple transactions. This is important since initial setup of a new platform is likely to involve transmitting a sequence of several pieces of information that must be checked for integrity and authority.

In an alternate embodiment, comparison system 120 can work incrementally, and accept a match after a certain number of digits have been typed. With an appropriately chosen hash function, one that is collision-free within any subset of its digits, a system can make a tradeoff between the number of digits that must be typed and the degree of confidence that the match is valid (not due to chance).

In another alternate embodiment, authorizing entity 150 can supply user 130 with some subset of the transformation value, such as the first N digits, where N is less than the total number of digits. Authorizing entity 150 instructs user 130 to compare the supplied digits with the corresponding subset of displayed digits. Authorizing entity 150 can make a tradeoff between the number of digits that must be matched and the degree of confidence that the match is valid (not due to chance).

The present invention is especially applicable, in one embodiment, at a time when a new user platform 110 is first installed in a network and a system administrator desires to transmit and install a boot image on user platform 110. User platform 110, being a new platform, lacks a public key for authentication of transmitted information, therefore, a system or method other than public key cryptography is required in order to authenticate the boot image. Failure to authenticate the boot image before installation can result in a defective or unauthorized boot image being installed on user platform 110.

Figure 2:
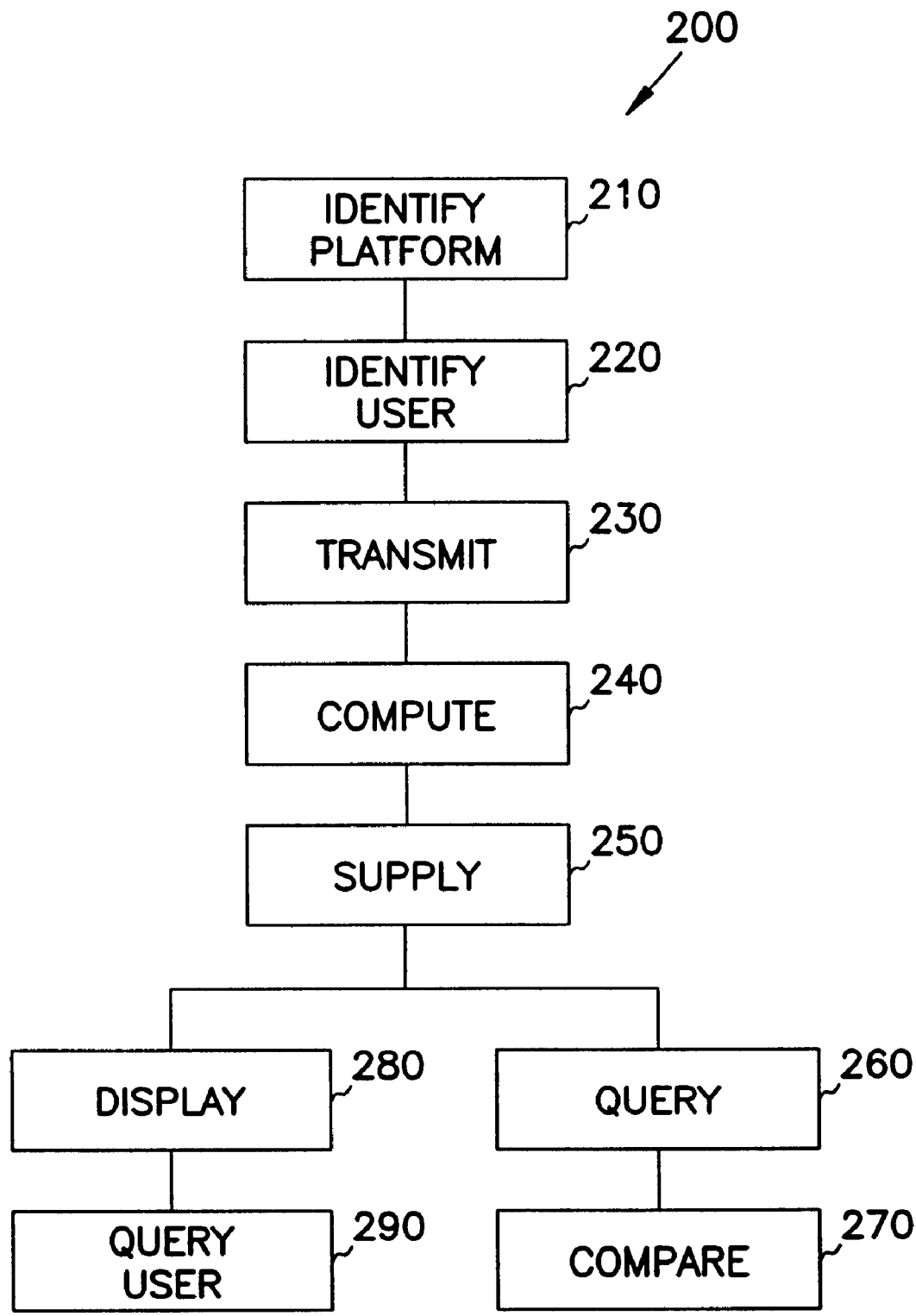
FIG. 2 is a general flow diagram of a method for authenticating information, according to one embodiment of the invention.

Referring to FIG. 2, a general flow diagram of an authentication method 200, according to one embodiment of the invention, is shown. Method 200 includes identify platform 210, identify user 220, transmit 230, compute 240, supply 250, query 260, compare 270, display 280, and query user 290. In identify platform 210 and identify user 220, an authorizing entity identifies a user platform for receiving information and a user responsible for the platform. For example, an IT organization identifies a newly installed workstation as requiring installation of a boot image and identifies an engineer as responsible for the installation of software on the workstation. in transmit 230 and compute 240, information and a credential are transmitted to the user platform identified in identify platform 210, and a transformation value of the credential is computed on the user platform. For example, a boot image and credential are transmitted from a remote platform to a workstation, and a hash value of the credential is computed on the workstation. In supply 250, the user is supplied with a computed transformation value of the credential. For example, a hash value of the credential is printed in a memo and delivered to an engineer. In one embodiment, in query 260 and compare 270, the user is queried for the supplied transformation value and the platform compares the supplied transformation value to the transformation value generated in compute 240. For example, an engineer is queried by the workstation for the hash value provided in supply 250 and the workstation compares the supplied value to the hash value of the credential computed on the workstation. A match authenticates the transmitted information. In an alternate embodiment, in display 280 and query user 290, the user platform displays the computed transformation value of compute 240 and queries the user as to whether the computed transformation value matches the supplied transformation value. For example, the hash value of a credential computed on a workstation is displayed along with a query to the user of the workstation as to whether the displayed value matches the supplied transformation value of the credential. A match authenticates the transmitted information.

Figure 3:
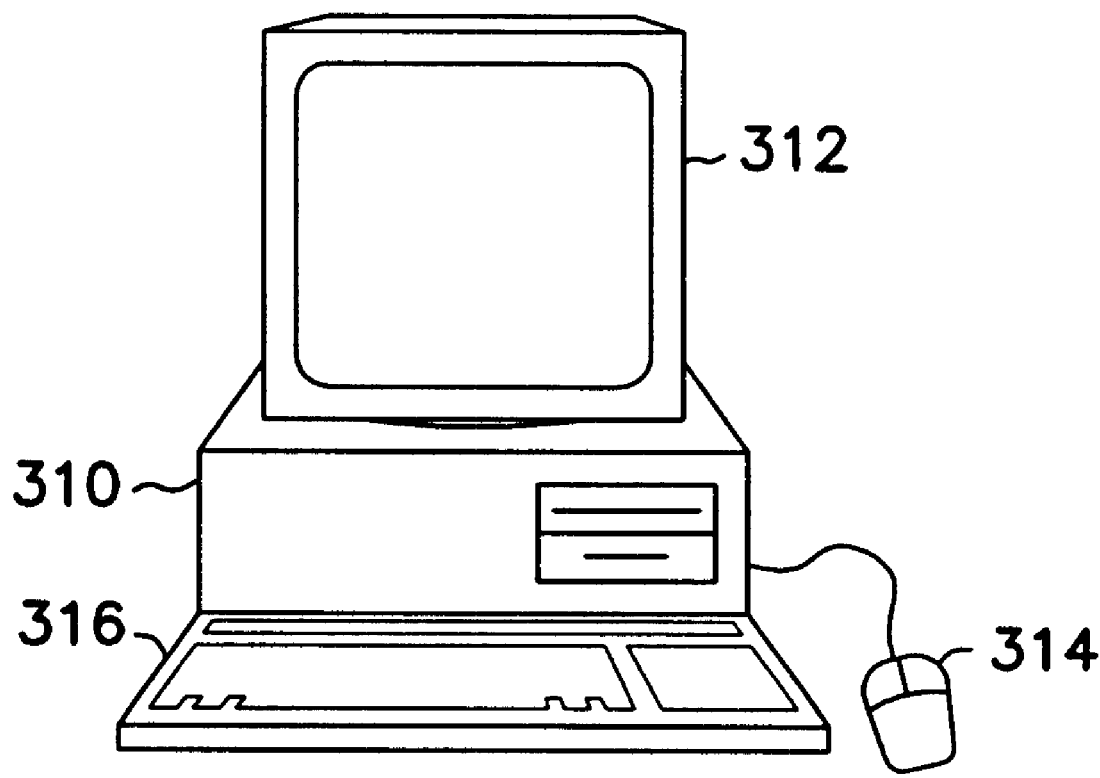
FIG. 3 is a diagram of a representative computer, in conjunction with which embodiments of the invention may be practiced.

A representative computer, in conjunction with which embodiments of the invention may be practiced, is now described. Those of ordinary skill within the art can appreciate, however, that the invention is not limited to implementation in conjunction with this computer. Referring to FIG. 3, a diagram of the computer in conjunction with which embodiments of the invention may be practiced is shown. Computer 310 is operatively coupled to monitor 312, pointing device 314, and keyboard 316. Computer 310 includes a processor, random-access memory (RAM), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 310.

Monitor 312 permits the display of information within a viewing area, including video and other information, for viewing by a user of the computer. The invention is not limited to any particular monitor 312, and monitor 312 is one type of display device that may be used by the invention. Such monitors include cathode ray tube (CRT) displays, as well as flat panel displays such as liquid crystal displays (LCD's). Pointing device 314 permits the control of the screen pointer provided by the graphical user interfaces. The invention is not limited to any particular pointing device 314. Such pointing devices include mouses, touch pads, trackballs, wheels, remote controls and point sticks. Finally, keyboard 316 permits entry of textual information into computer 310, as known within the art, and the invention is not limited to any particular type of keyboard.

Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations of the invention. It is manifestly intended that this invention be limited only by the following claims and equivalents thereof.

What is claimed is:

1. A system comprising:
   a user platform to authenticate information by using a transformation value generated from the information, where the platform lacks a public key related to the information;
   a communication channel; and
   a remote platform coupled to the user platform by the communication channel and the remote platform to transmit the information to the user platform via the communication channel.

2. The system of claim 1, wherein the platform is to authenticate the information by comparing a transformation value received from a user to the transformation value generated from the information.

3. The system of claim 1, wherein the platform is to authenticate the information by displaying the transformation value generated from the information and requesting that the user match the transformation value generated from the information to a transformation value known to the user.

4. A system comprising:
   a user platform that lacks a public key for information accompanying a credential and that is capable of ensuring that the information accompanying the credential is authorized by using a transformation value generated from the credential;
   a communication channel; and
   a remote platform coupled to the user platform by the communication channel and the remote platform to transmit the information and the credential to the user platform via the communication channel.

5. The system of claim 4, wherein the user platform is to ensure that the information is authorized by comparing a transformation value received from a user to the transformation value generated from the credential.

6. The system of claim 4, wherein the user platform is to ensure that the information is authorized by displaying the transformation value generated from the credential and requesting that a user match the transformation value generated from the credential with a transformation value known to the user.

7. The system of claim 4, wherein the credential includes a transformation value for the information, and the user platform is to check the integrity of the information by comparing a transformation value generated from the information to a transformation value contained in the credential.

8. A system comprising:
   a user platform that lacks a public key for information accompanying a credential having a credential subset and that is capable of ensuring that the information accompanying the credential is authorized by using a transformation value generated from the credential subset;
   a communication channel; and
   a remote platform coupled to the user platform by the communication channel and the remote platform to transmit the credential to the user platform via the communication channel.

9. The system of claim 8, wherein the platform is to ensure authority for information accompanying the credential by comparing a transformation value received from a user to the transformation value generated from the subset.

10. The system of claim 8, wherein the platform is to ensure authority for information accompanying the credential by displaying the transformation value generated from the subset and requesting that the user match the transformation value generated from the subset with a transformation value known to the user.

11. The system of claim 8, wherein the credential includes a transformation value for the information, and the user platform is to check the information for integrity by comparing a transformation value generated form the information to the transformation value included in the credential.

12. The system of claim 8, wherein the credential includes a digital signature, and the user platform is to derive a public key from the credential subset, and the user platform is to check the credential for integrity by verifying the digital signature using the public key.

13. A method comprising:
    receiving information;
    computing a transformation value for the information; and
    authenticating the information without a public key by using the transformation value.

14. The method of claim 13, wherein receiving information comprises receiving information that is a request for a change to a platform configuration parameter.

15. The method of claim 13, wherein computing a transformation value for the information comprises computing a hash of the information.

16. The method of claim 13, wherein authenticating the information without a public key by using the transformation value comprises:
    receiving a transformation value from a user; and
    comparing the transformation value to the transformation value received from the user.

17. A method comprising:
    receiving information and a credential;
    computing a transformation value for the credential; and
    verifying that the information is authorized by using the transformation value but without using a public key.

18. The method of claim 17, wherein computing a transformation value for the credential comprises computing a transformation value comprising a hash of the credential.

19. The method of claim 17, wherein verifying that the information is authorized by using the transformation value but without using a public key comprises:

querying a user for a transformation value known to the user; and comparing the transformation value to the transformation value known to the user.

20. The method of claim 17, wherein verifying that the information is authorized by using the transformation value but without using a public key comprises:

displaying the transformation value to a user; and querying the user as to whether the transformation value matches a transformation value known to the user.

21. The method of claim 17, further comprising checking the integrity of the information by comparing a transformation value generated from the information to a transformation value contained in the credential.

22. A method comprising:

receiving information and a credential having a credential subset;

computing a transformation value for the credential subset; and verifying that the information is authorized by using the transformation value but without using a public key.

23. The method of claim 22, wherein verifying that the information is authorized by using the transformation value but without using a public key comprises:

displaying the transformation value to a user; and querying the user as to whether the transformation value displayed matches a transformation value known to the user.

24. The method of claim 22, wherein verifying that the information is authorized by using the transformation value but without using a public key comprises:

querying a user for a transformation value known to a user; and comparing the transformation value to the transformation value known to the user.

25. The system of claim 22, further comprising:

receiving a credential having a transformation value for the information; and checking the information for integrity by comparing a transformation value generated form the information to the transformation value included in the credential.

26. The system of claim 22, further comprising:

receiving a credential having a digital signature;

deriving a public key from the credential subset; and checking the credential for integrity by verifying the digital signature using the public key.

27. A computer program product, comprising:

a program storage device readable by a digital processing apparatus; and a program of instructions tangibly embodied on the program storage device and executable by the digital processing apparatus to perform a method comprising:

receiving information;

computing a transformation value for the information; and authenticating the information without a public key by using the transformation value.

28. The method of claim 27, wherein receiving information comprises receiving information that is a request for a change to a platform configuration parameter.

29. The method of claim 27, wherein authenticating the information without a public key by using the transformation value comprises:

receiving a transformation value from a user; and comparing the transformation value to the transformation value received from the user.

30. The method of claim 27, wherein authenticating the information without a public key by using the transformation value comprises:

displaying the transformation value to a user; and querying the user as to whether the transformation value matches a transformation value known to the user.

31. A method comprising:

receiving information, wherein receiving information comprises receiving information that is a request for a change to a platform configuration parameter;

computing a transformation value for the information; and authenticating the information without a public key by using the transformation value .

32. The method of claim 31, wherein computing the transformation value for the information comprises computing a hash of the information.

33. The method of claim 31, wherein authenticating the information without the public key by using the transformation value comprises:

receiving a user transformation value from a user; and comparing the transformation value to the user transformation value.

34. A computer program product, comprising:

a program storage device readable by a digital processing apparatus; and a program of instructions tangibly embodied on the program storage device and executable by the digital processing apparatus to perform a method comprising:

receiving information that is a request for a change to a platform configuration parameter;

computing a transformation value for the information; and authenticating the information without a public key by using the transformation value.

35. The method of claim 34, wherein authenticating the information without the public key by using the transformation value comprises:

receiving a user transformation value from a user; and comparing the transformation value to the user transformation value.

36. The method of claim 34, wherein authenticating the information without the public key by using the transformation value comprises:

displaying the transformation value to a user; and querying the user as to whether the transformation value matches a user transformation value known to the user.

* * * * *

UNITED STATES PATENT AND TRADEMARK OFFICE
CERTIFICATE OF CORRECTION

PATENT NO.   : 6,477,645 B1
DATED        : November 5, 2002
INVENTOR(S)  : Paul C. Drews It is certified that error appears in the above-identified patent and that said Letters Patent is hereby corrected as shown below:

<u>Column 2,</u>
Line 29, delete "Such" and insert -- such --, therefor.

<u>Column 3,</u>
Line 26, delete "ail" and insert -- all --, therefor.

<u>Column 5,</u>
Line 23, delete "." after "165".

<u>Column 6,</u>
Line 26, delete "in" and insert -- In --, therefor.

Signed and Sealed this

Eighteenth Day of March, 2003

JAMES E. ROGAN
*Director of the United States Patent and Trademark Office*